United States Patent [19]
Grietens

[11] 3,907,192
[45] Sept. 23, 1975

[54] PROCESS FOR THE MANUFACTURE OF A GLAZING UNIT

[75] Inventor: Joannes Grietens, Kasterlee, Belgium

[73] Assignee: Glaverbel-Mecaniver, Watermael-Boitsfort, Belgium

[22] Filed: Feb. 6, 1973

[21] Appl. No.: 330,097

[30] Foreign Application Priority Data
Feb. 11, 1972 Luxemburg.............................. 64771

[52] U.S. Cl. ................. 228/256; 228/122; 228/903
[51] Int. Cl.² .................... B23K 31/02; B23K 35/12
[58] Field of Search .......... 29/473.1, 503, 488, 492, 29/471.9; 228/33, 37

[56] References Cited
UNITED STATES PATENTS

| | | | |
|---|---|---|---|
| 2,235,680 | 3/1941 | Haven et al....................... | 29/492 X |
| 2,469,392 | 5/1949 | Jones et al............................ | 29/503 |
| 2,577,306 | 12/1951 | Browne.......................... | 29/473.1 X |
| 2,870,532 | 1/1959 | Young .............................. | 29/503 X |
| 3,136,032 | 6/1964 | Berndsen....................... | 29/473.1 X |
| 3,293,065 | 12/1966 | Roetter........................... | 29/473.1 X |
| 3,323,204 | 6/1967 | Goeckel et al..................... | 29/473.1 |
| 3,543,385 | 12/1970 | Javoux et al...................... | 29/503 X |
| 3,648,915 | 3/1972 | Leibfried et al. ................. | 29/503 X |

Primary Examiner—Ronald J. Shore
Attorney, Agent, or Firm—Cushman, Darby & Cushman

[57] ABSTRACT

A process for manufacturing a glazing unit by jointing a metallized margin of a sheet of glass to an intervening spacer strip following a course along the peripheral margin of the unit, the joint between the sheet and the strip along at least a section of such course being formed by applying solder into the corner angle between such sheet and the strip to form a solder bead along the section, the solder bead being at least in part progressively formed by discharging a continuous stream of molten solder directly into the corner angle from an adjacent orifice while such orifice on the one hand and the strip and sheet on the other hand are relatively displaced substantially parallel with the course section and apparatus for carrying out such process.

6 Claims, 7 Drawing Figures

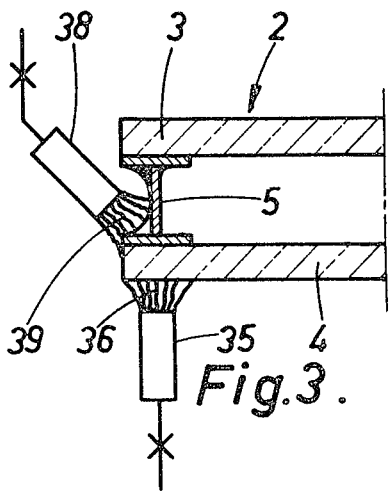
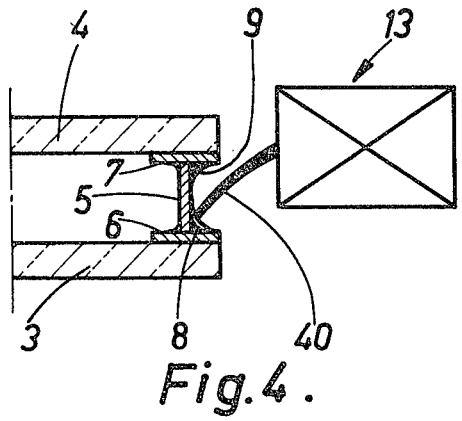
Fig.3.  Fig.4.
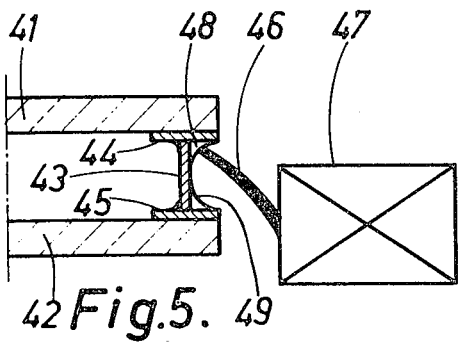
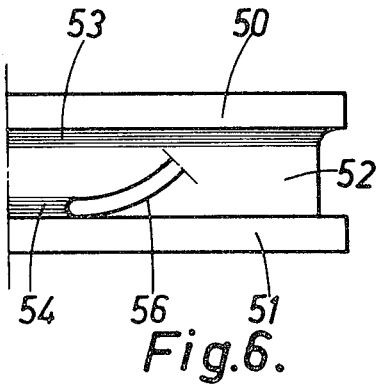
Fig.5.  Fig.6.
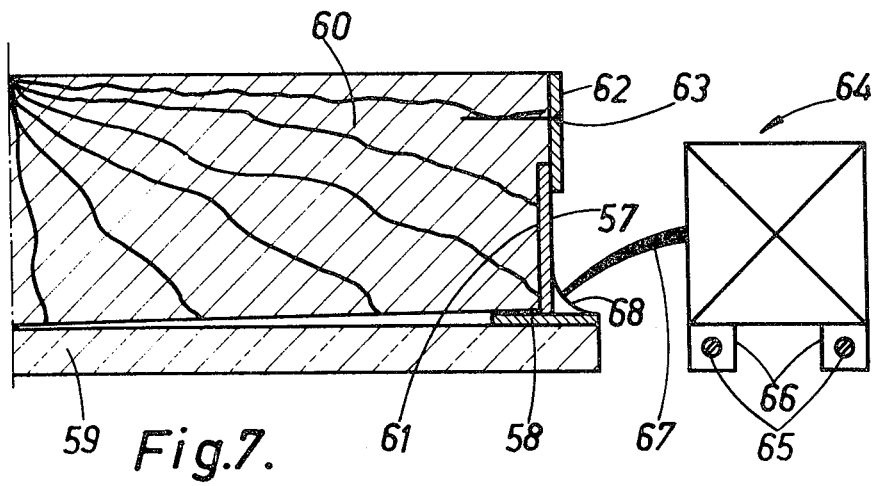
Fig.7.

PROCESS FOR THE MANUFACTURE OF A GLAZING UNIT

This invention relates to a process for manufacturing a glazing unit by jointing metallized margins of sheets of glass to an intervening spacer strip or strips following a course along the peripheral margin of the unit, the joint between at least one of said sheets and the or at least one said strip along at least a section of said course being formed by applying solder into the corner angle between such sheet and said strip to form a solder bead along said section. The invention also relates to apparatus for use in carrying out such process.

In a known process each solder bead joining a said spacer strip to a metallized glass sheet margin is formed with the aid of a soldering iron. When the solder joints are formed manually the iron is used to melt the solder metal in the joint angle along which the iron is drawn. In the case of a mechanized process, molten solder is caused to flow onto the soldering iron which is heated to keep the solder molten and is placed so as to cause the molten solder to flow from the iron into the joint while the iron and the work are relatively displaced to cause progressive formation of the solder bead.

Joints formed by the known process often exhibit defects of one form or another. Such defects are a source of mechanical weakness in the assembly and may render the joint penetrable by air which is of course inadmissible in the case of hollow glazing units which are intended to be hermetically sealed.

It is known to improve the quality of a joint so formed by retouching, i.e., by passing a heated soldering iron one or more times along the formed solder bead. However such retouching, which is essentially a manual operation, takes up valuable time of skilled workmen and is obviously something to be avoided as far as possible.

The present invention aims to provide a process whereby solder joints of good quality can be more consistently and reliably formed in an economic manner in the manufacture of glazing units.

According to the present invention, a process for manufacturing a glazing unit by jointing metallized margins of sheets of glass to an intervening spacer strip or strips following a course along the peripheral margin of the unit, the joint between at least one of said sheets and the or at least one said strip along at least a section of such course being formed by applying solder into the corner angle between such sheet and said strip to form a solder bead along said section, is characterized in that at least one said solder bead is at least in part progressively formed by discharging a continuous stream of solder directly into said corner angle from an adjacent orifice while such orifice on the one hand and said strip and sheet on the other hand are relatively displaced substantially parallel with said course section.

This process affords the advantage that it enables good quality solder joints to be more easily and reliably formed in industrial mass processing conditions than when using a soldering iron as in the known process. Generally speaking a solder bead of very satisfactory quality for forming the final joint can be produced by a single pass, i.e., by a single relative displacement of the orifice and the work substantially parallel with the line of the joint. However the performance of two or more successive passes is not excluded. Unlike formerly known processes wherein a solder bead is formed by means of successive passes of a soldering iron, it is not necessary when forming a solder bead in accordance with the invention by discharging molten solder into the joint angle in two or more "passes", to employ, at any stage, a soldering flux.

A bead formed by performance of the invention may of course be retouched or improved in some other way if in any case this should prove necessary. However any improvement work which has to be done for bringing the bead to a given final quality standard is of a less radical nature and can be carried out more easily than would be the case if the process according to the invention, involving discharge of a stream of solder directly into the joint angle, were not made use of.

The process also has the advantage of saving costs, involved in the known processes, of replacing the soldering irons, usually made of copper, which are rather rapidly corroded by some of the soldering metals used.

While the process can be and is preferably used so that the solder bead is formed entirely by discharging a stream of molten solder directly into the joint angle in one or more "passes", the process can be used for finishing or improving a bead which has already been formed in the corner angle by some other process. For example, the invention as hereinbefore defined includes a process in which an initial solder bead is formed in the corner angle by means of a soldering iron and molten solder is subsequently discharged directly into the said corner angle in accordance with the invention to form a layer of solder on top of the initial bead. Thus, in such a process the complete solder bead is formed in part by a conventional technique using a soldering iron and in part by discharging a stream of molten solder directly into the corner angle. In such a process the initial bead does not have to meet stringent specifications and it can be very rapidly formed.

The process according to the invention is as versatile in respect of the range of spacer strip materials and glass coating metals which may be soldered as any other soldering process. In fact the absence of dragging contact between the work and a heated soldering iron makes the process applicable in situations where such contact would be objectionable. For example some spacer strips which otherwise have desirable specifications for the purpose in view would be liable to undergo deleterious modifications, possibly in shape or metallographic structure, if subjected to frictional contact by a soldering iron above a certain temperature. This problem is particularly liable to arise in the case of spacer strips made of lead or a lead-based alloy.

The sheet margin to which the spacer strip is to be soldered may for example be coated with copper. The adherent film of copper or other metal may if desired be wholly or partly covered by a layer of solder metal, e.g., a layer of a tin alloy, applied to the metal film prior to the joining in place of the spacer strip by the soldering process according to the invention.

It is also an important advantage of the process that it can be performed without risk of impairment of the mechanical strength of the solder bead due to dissolution of metal of a soldering iron, e.g., copper, in the solder metal.

The relative displacement of the orifice and the work which is effected in order that the solder bead shall be progressively formed along the joint line may comprise a displacement of the orifice while the work is stationary, a displacement of the work while the orifice is stationary, or a displacement of both the orifice and the work.

Preferably the sheet and spacer strip defining said corner angle are displaced parallel with the line of the joint and the orifice from which the solder stream is discharged is fixed. When the aperture is fixed, the discharged stream of solder can be steadier and more uniform, these being factors of importance for obtaining high quality results.

The discharge of solder from the orifice can be automatically controlled so as automatically to commence and cease at moments dependent on the relative positions of the orifice and the work during the relative displacement thereof substantially parallel with the line of the joint, so that unwanted discharge of solder can be avoided and the amount of solder discharged can be limited to that which is required for forming a solder bead of the required length.

Preferably the stream of solder follows a free trajectory with a horizontal component of motion generally transverse to the direction of the relative displacement between the orifice and the work (comprising the sheet and strip defining said corner angle). Such a discharge of the solder is most conducive to the formation of a good quality solder bead and is appropriate when the work is orientated in what is the most convenient manner, i.e., with the metallized sheet and the spacer strip respectively disposed in a horizontal and a vertical plane.

The free trajectory of the solder steam is preferably at least 1 cm but not more than 5 cm in length. This condition has been found in practice to be helpful to the formation of a soldering bead of very good quality.

Advantageously, the position and orientation of the orifice and the discharge velocity of the solder stream, in relation to the position of the sheet and strip defining the corner angle is such that the solder stream initially impinges against the spacer strip of such sheet and flows toward the vertex of the corner angle. By avoiding discharge of the solder stream directly into the vertex, the risk of excessive flow of solder between the metallized glass sheet and the spacer strip is reduced. Of course, the solder stream could, as an alternative, initially impinge against the metallized surface.

As an alternative to discharging the solder so that it follows a free trajectory, the discharge orifice may be located in the joint angle. Thus, the solder may be caused to flow along a conduit the discharge end of which makes contact with the work in the joint angle. In that case, of course, the conduit protects the molten solder from oxidation during flow to the work from a supply of molten solder.

In some processes according to the invention the metallized sheet portion and/or the spacer strip defining the corner angle is or are pre-heated. In consequence of the pre-heating, each region of the metallized sheet portion and/or the spacer strip along the length of the joint is at a certain elevated temperature when the solder stream reaches that region. The pre-heating is preferably achieved by means of one or more flames of burning gas. Such flame or flames may, for example, be caused to play on the work along the line of the joint and immediately in advance of the solder stream.

In order to insure the correct predetermined flow of solder to form or to complete a solder bead in the joint angle, the work should be supported so that it is not subjected to vibration or other uncontrolled movement but remains quite still or is displaced so that the line of junction between the metallized glass sheet and the spacer strip moves along a predetermined line.

The bead formed wholly or in part by the solder discharged into the joint angle may be heated to improve the bead quality. Preferably the bead is heated progressively along its length, each increment of the length of the bead being heated immediately or soon after its formation.

In particularly advantageous processes according to the invention, the joint comprising the bead of solder formed wholly or in part by discharging a stream of molten solder into the corner angle is progressively transversed by at least one flame so that at each moment of its progress the flame acts on such solder metal before it has completely solidified and the final bead is formed by solidification of solder metal from the molten condition in which it is left by such flame. Such processes according to the invention enable soldered joints of excellent quality to be very rapidly and reliably formed and usually a single pass of the solder stream and a flame suffices for forming the complete bead.

The invention includes apparatus for use in manufacturing a glazing unit by jointing metallized margins of sheets of glass to an intervening spacer strip or strips following a course along the peripheral margin of the unit, said apparatus comprising a work-support for supporting a glass sheet in a substantially horizontal plane and means for supplying solder metal for forming a solder bead along an exterior corner angle between such sheet and a said spacer strip, characterized in that said solder supplying means comprises a solder discharge orifice disposed at a higher level than said work-support and, in plan aspect, outside one of its side edge boundaries, and means for feeding molten solder to said orifice to cause molten solder to discharge therefrom as a continuous stream, said orifice being orientated so that such stream follows a trajectory directed over said boundary and toward the support whereby the said stream can directly enter a said exterior corner angle. By means of such apparatus, good quality solder joints can be more easily and reliably formed in industrial mass processing conditions than when using soldering apparatus as hitherto known.

Preferably the solder-supplying means comprises a control valve, operative in a passageway for conducting molten solder to said orifice, and actuating mechanism whereby said valve can be closed to interrupt flow of solder along said passageway at any time, heating means being provided for maintaining solder in said passageway in molten condition even while said valve is closed. In such an apparatus the control valve can be actuated to cause molten solder discharge to commence and cease at required moments of time coinciding with the commencement and termination of displacement of the molten solder discharge orifice along the length of a corner angle or of displacement of a said corner angle relative to said orifice.

Advantageously, means is provided for pre-heating a margin of a glass sheet and/or a spacer strip defining a said exterior corner angle. It is often easier to obtain given high quality results when using apparatus which preheats the work.

In certain apparatus according to the invention there is at least one gas burner for directing a flame onto solder metal after it has been discharged from the said orifice into said angle. By using such a flame the quality of the solder bead formed by the apparatus can be improved.

Various embodiments of the invention, selected by way of example, will now be described with reference to the accompanying diagrammatic drawings in which:

FIG. 3 is a cross-sectional detail of part of the apparatus shown in FIGS. 1 and 2, the section being on line III—III in FIG. 2;

FIG. 4 illustrates a later stage of a glazing unit manufacturing process than that represented in FIG. 1, using the same apparatus;

FIG. 5 represents a stage in another process according to the invention;

FIG. 6 shows part of a glazing unit in course of being manufactured by means of another process according to the invention; and FIG. 7 illustrates another apparatus according to the invention in course of being used for manufacturing a glazing unit.

Figure 1:
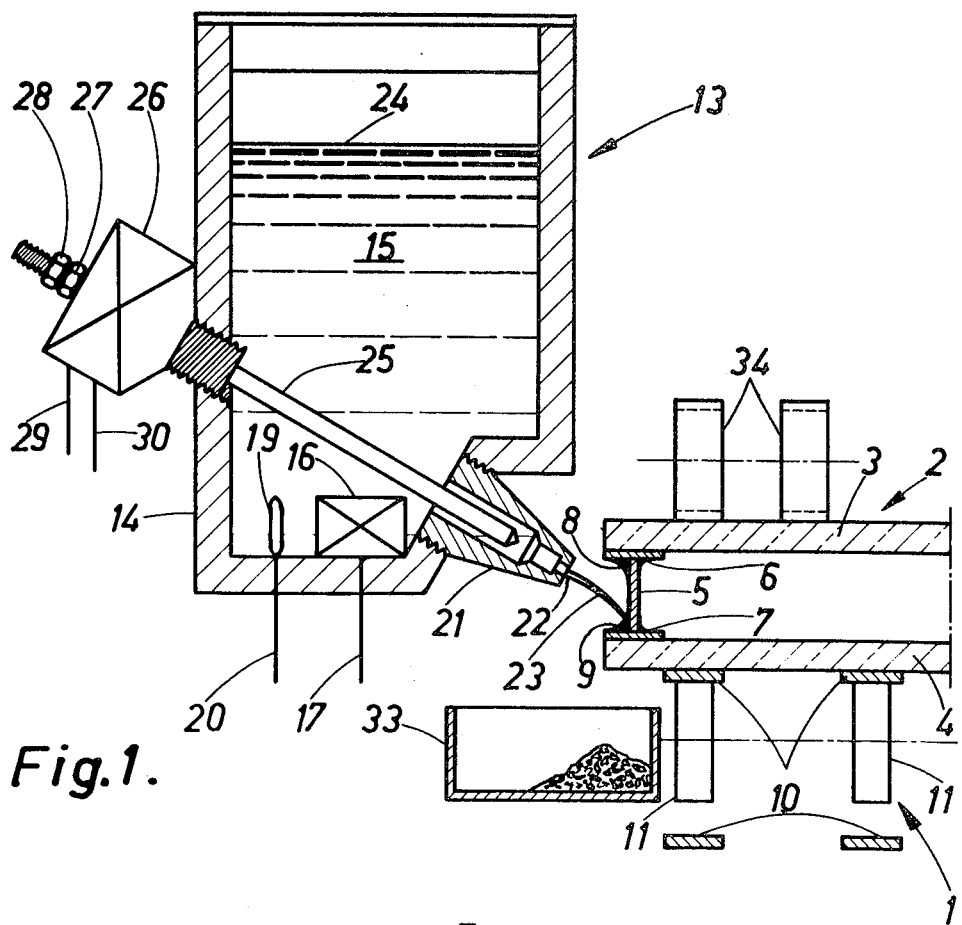
FIG. 1 is a cross-sectional end view of an apparatus according to the invention, in line I—I in FIG. 2.
Figure 2:
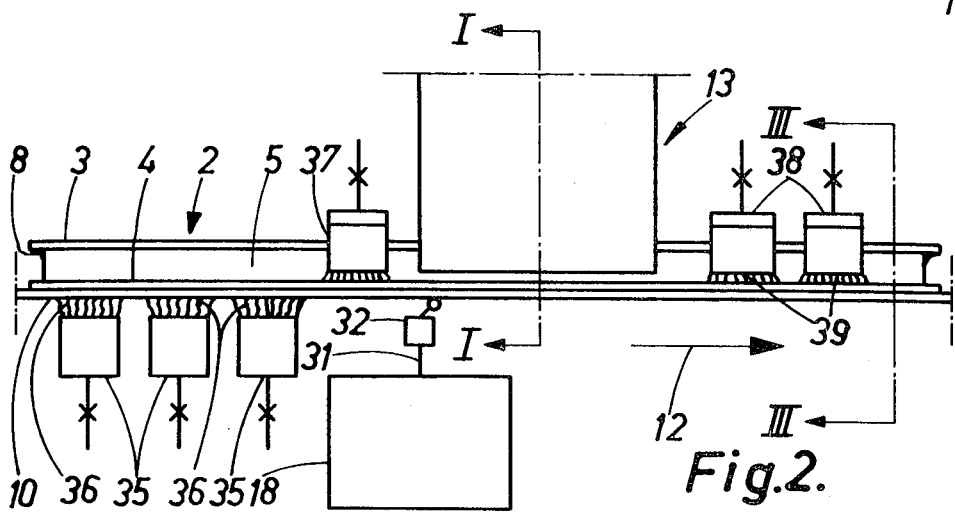
FIG. 2 is a front elevation of this apparatus.

The apparatus shown in FIGS. 1–3 comprises a work-support 1 which is shown supporting the components of a glazing unit 2 in course of being assembled. The components in question comprise two sheets of glass 3 and 4 and an intervening spacer strip 5. This spacer strip may extend around the whole of the peripheral margin of the unit or the said strip may extend only along one side margin of the unit, in which case one or more further strips extend(s) along the other side margins of the unit. Prior to connecting the sheets 3 and 4 to the spacer strip 5, the margins of the said sheets which are to be connected to the spacer strip are metallized, e.g., by depositing a copper-based film on those margins. The metal deposited directly on the glass sheet margins may be covered with a layer of solder metal, e.g., a layer of a tin-based alloy. In FIGS. 1 and 4 the said coatings on the glass sheets 3 and 4, such coatings comprising the metal film or the metal films and the overcoating of solder metal, are designated 6 and 7 respectively. One procedure for assembling the marginally coated glass sheets and the spacer strip is to solder the spacer strip to the coated margin of one sheet while this is supported on the conveyor and then to invert the assembly thus formed onto the second glass sheet preparatory to soldering the spacer strip to the coated margin of that other sheet. In the embodiment of the invention represented in FIGS. 1 to 3, this procedure is followed. The spacer strip 5 was first soldered to the coated margin of the glass sheet 3 while that sheet was supported directly on the conveyor 1 and the assembly thus formed was inverted and placed on top of the marginally coated glass sheet 4 after placing this sheet on the conveyor. The figures show the apparatus in course of being used for soldering the spacer strip 5 to the marginal coating 7 of the sheet 4. The spacer strip itself may be a lead-based metal strip which may if required be pre-coated with a layer of solder alloy.

The apparatus according to the invention as represented in FIGS. 1 to 3 is employed for forming solder beads in the exterior corner angles defined by the spacer strip 5 and the metal coated margins of the sheets 3 and 4. The solder bead formed in the exterior angle between spacer strip 5 and the coating on sheet 3 is designated 8 while the solder bead which is being formed in order to connect the spacer strip 5 to the coated margin of sheet 4 is designated 9.

The work support 1 on which the work is supported during the soldering operation is in the form of a conveyor comprising a plurality of endless conveyor belts 10 which are driven by rollers 11 which support the upper reaches of the said belts. During the formation of a given solder bead, the conveyor belts are driven via the rollers 11 in order to convey the work past the various components of the soldering installation in the direction of the arrow 12 (FIG. 2).

The principal part of the soldering installation is the solder feeding means, generally designated 13 (FIG. 2). This solder feeding means comprises a container 14 which is kept partly filled with molten solder 15. The contents of the container 14 (which may be heat-insulated) are heated by a heating device 16 to maintain the solder in the required molten condition. The heating device 16 is of electrical resistance type and is connected by a cable 17 to a control unit 18 which is in turn connected to a source of EMF (not shown). The control unit 18 incorporates an electric current supply regulator which regulates the current to the heating device 16 in dependence on the temperature of the molten solder 15 as indicated by a thermo-couple 19 which is connected to the control unit 18 by a cable 20.

The container 14 is fitted with a nozzle 21 which is orientated so that molten solder which flows through the nozzle leaves the discharge orifice 22 of the nozzle as a continuous stream 23 with a trajectory such that it travels directly into the exterior corner angle in which the solder bead 9 is to be formed. Actually, the nozzle 21 is disposed and orientated so that the trajectory of the discharged stream of molten solder, which curves downwardly due to gravity, intercept the spacer strip 5 just above the vertex of the corner angle. The process according to the invention can be performed by directly discharging the stream of molten solder into the vertex of the corner angle but in that case there is more tendency for molten solder to leak into the interior of the glazing unit between the spacer strip 5 and the marginal coating 7 on the glass sheet 4.

The precise point of impingement of the solder stream on the work depends on a number of factors including the position of the container 14 in the vertical and horizontal planes in relation to the work, the level of the surface 24 of the molten solder in the container and the resistance to flow of molten solder through the nozzle 21. In the mass-production manufacture of glazing units, spacer strips are connected to a succession of glass sheets conveyed past the soldering installation by the conveyor 1 and there may be some variation in thickness from one glass sheet to another. In order to compensate for this thickness variation and insure that the solder stream impinges on the work at a predetermined level notwithstanding such thickness variation, means (not shown) is provided whereby the position of the container 14 in one or the other or both of said planes is automatically adjusted in dependence on such thickness variations. The displacements of the container 14 may for example take place in response to movements of a feeler which is disposed so as to be contacted by the upper faces of the glass sheets supported on the conveyor 1 as they travel past the soldering installation.

The resistance to flow of molten solder through the nozzle 21 depends on the setting of a needle valve 25 which makes screw-threaded connection with an actuating mechanism 26 which is secured to the wall of the container 14. The setting of the needle valve 25 in its fully open position can be adjusted by rotating a nut 27 which is screwed onto the free end portion of the needle valve. The nut 27 can be held in any adjusted position by a lock nut 28. The actuating mechanism 26 permits rapid operation of the needle valve 25 under remote control in order to terminate the discharge of solder from the container. The actuating mechanism 26 may for example be of electro-penumatic type. The mechanism is connected to the control unit 18 by a conductor lead 29 and an air line 30. The opening and closing movements of the needle valve 25 are triggered automatically in dependence on the movements of glazing unit assemblies past the soldering installation. For this purpose the actuating mechanism 26 is connected via the control unit 18 and a conductor lead 31 with a sensing switch 32 located so that it is closed on being contacted by the leading edge of a glass sheet resting on the conveyor 1. The location of the switch 32 along the conveying reach of the conveyor is such that the needle valve 25 is opened at the correct moment for discharging molten solder into the corner angle between the spacer strip 5 and the coating margin 7 of the sheet 4 at the commencement of the transit of the spacer strip 5 past the discharge nozzle 21. The needle valve 25 automatically closes as the trailing edge of the sheet 4 leaves the sensing switch 32. If necessary, the control unit 15 may incorporate one or more timing devices to facilitate the accurate regulation of the actuating times of the needle valve 25.

A receptacle 33 is provided for collecting any quantities of solder which may discharge past a glazing unit assembly.

The illustrated apparatus also incorporates means comprising a number of rollers 34 which can be positioned as shown in FIG. 1 so that the rollers make rolling contact with the top face of the upper glass sheet of a glazing unit assembly in order to hold that sheet in contact with the spacer strip and to suppress vibration of the glazing unit assembly.

In a direction upstream from the solder feeder 13, i.e., at the side thereof at which it is approached by glazing unit assemblies supported on the conveyor 1, there is means for pre-heating the margin of the glass sheet to which the spacer strip is to be soldered. In the illustrated embodiments the heating means comprises a number of heaters 35 which may for example be gas burners with flames 36. A further heating means 37 is provided for pre-heating the spacer strip and the metal coating on the margin of the glass sheet to which that spacer strip is to be soldered. Preferably the heating means 37 comprises one or more gas burners disposed for directing a flame or flames obliquely downwardly into the corner angle in which the solder bead is to be formed.

At positions downstream with respect to the solder feeder 13, there are further gas burners 38 which are likewise disposed and orientated so as to direct flames 39 into the exterior corner angle between the spacer strip and the lower glass sheet. As these burners 38 are located downstream with respect to the solder feeder 13, their flames 39 act on the solder bead formed by the discharge of the molten solder stream. The effect of the action of the burners 38 is to improve the wetting of the faces defining the corner angle by the molten solder and thus to promote the formation of a solder bead of correct form with an exposed concave face merging tangentially with such faces. The effect of the burners 38 is particularly beneficial if their spacing from the solder feeder 13 is such that the flames 39 act upon the solder metal discharged into the corner angle before that solder metal has completely solidified.

The burners may for example be of the combustion chamber type with internal refractory ceramic linings.

Generally speaking, by using the illustrated apparatus in the way described, it is possible to form a bead of excellent quality entirely by a single "pass", i.e., by a single transit of the glass sheet and spacer strip defining the joint angle, past the soldering installation. However, it is not excluded that the process may be repeated one or more times so that in each pass following the first the discharged solder stream forms a layer of solder on top of the bead formed during the preceding pass or passes.

The illustrated apparatus can also be used in a process according to the invention for completing a solder bead which has already been partially formed by some other process. For example, let it be supposed that the solder bead 8 connecting the spacer strip 5 with the coated margin of the sheet 3 was rapidly formed, e.g., using a soldering iron, and remains to be brought to the final standard of quality. In such a circumstance, after forming the good quality solder beads between the spacer strip 5 and the metallized margin of the sheet 4 as described with reference to FIGS. 1–3, the work can be inverted and conveyed again through the soldering installation. In that case the work is in the orientation represented in FIG. 4, i.e. with the glass sheet 4 uppermost and the glass sheet 3 supported directly on the conveyor. In this further transit through the soldering installation a stream 40 of molten solder (identical with the stream 23) is discharged directly into the exterior angle between the spacer strip 5 and the coated margin of sheet 3 and forms a layer of solder on top of the solder bead initially formed in some other way. The solder bead is thereby brought to a final form of high quality. It will be appreciated that, given that the process according to the invention is to be employed for completing the bead, the initial bead joining the strip 5 to the sheet 3 can be formed very rapidly by a continuous or intermittent manual pass of a soldering iron since at this stage it is merely necessary to attach the spacer strip 5 to the sheet 3 and it is not necessary to take that care which would be required if the bead were not subsequently to be completed by the process according to the invention. The initial attachment of the spacer strip 5 to the sheet 3 may be performed using a comparatively small amount of solder. When the bead is subsequently completed by performing a process according to the invention the amount of solder which is discharged from the solder feeder 13 during transit of the work past this feeder can be less than that required for the formation of the solder bead 9 because that bead was formed entirely by solder discharged during a single transit past the soldering installation.

In the manufacture of a complete glazing unit eight solder beads have to be formed, i.e., four beads for uniting the spacer strip or strips with each of the glass sheets (one bead to each margin). The one soldering installation can be used for forming all of the eight beads or some of them in successive transits of the glazing unit assembly past the soldering installation. Alternatively a plant may be used which comprises a number of the soldering installations arranged in spaced relation along a conveyor path or along the paths of two or more conveyors, with appropriate manual or automatic reorientation of the glazing unit assembly at appropriate times as required in order to bring different margins of the assembly into correct position for operating on by the soldering installations.

FIG. 5 represents a stage in a process according to the invention performed for manufacturing a glazing unit comprising sheets of glass 41 and 42 and a spacer strip 43 which is soldered to coatings 44 and 45 on the said sheets 41 and 42 respectively. The spacer strip 43 is jointed to the coated margin of sheet 41 by a solder bead formed by discharging a stream 46 of molten solder upwardly from a feeder 47 so that the stream travels directly into the exterior corner angle in which the solder bead 46 is to be formed. The feeder 47 may be similar to the feeder 13 described with reference to FIGS. 1 to 3 but with a discharge nozzle which is appropriately upwardly directed and possibly with the provision of means for exerting a higher discharge pressure on the molten solder, e.g., by exerting a superatmospheric pressure on the surface of the molten solder held in the container from which the solder stream discharges. The apparatus may be set up so that the trajectory of the solder stream 46 intercepts the coating 44 on the sheet 41 at a position adjacent the vertex of the corner angle. The solder bead 49 joining the spacer strip 43 with the coated margin of the glass sheet 42 may be formed by another solder feeder operating according to the invention, e.g., a feeder identical with the feeder 13 described with reference to FIGS. 1 to 3, this feeder being arranged along the same path of conveyance of the glazing unit so that the upper and lower solder beads 48 and 49 are formed during a single transit of the glazing unit assembly through the plant. The eight solder beads necessary for completing the glazing unit can thus be formed in four transits through the plant. There is also the advantage that the work does not have to be inverted as it does when plant is used which is only adapted to discharge a solder stream or streams into the corner angles between the spacer strip or strips and the lower glass sheet. By providing a succession of soldering installations for successively forming the upper and lower solder beads along the four margins of the glazing unit, so making it unnecessary for the unit repeatedly to pass through the plant, the unit can be manufactured in a very short period of time. It is of course possible to provide soldering installations for forming the upper and lower solder beads, on each side of the conveyor so that the upper and lower solder beads along opposed margins of the unit can be formed simultaneously during one transit of the unit through the plant. In that case the time required for manufacturing the unit is still further reduced.

FIG. 6 illustrates a process wherein a glazing unit comprising upper and lower glass sheets 50 and 51 and a spacer strip 52 is manufactured by connecting the spacer strip 52 to metallized margins of the sheets 50 and 51 by solder beads 53 and 54, at least the bead 54 being formed by discharging a stream of molten solder directly into the corner angle in which this bead is to be formed from a tube 56 located with its discharge end orifice in the corner angle. During the discharge of solder from the tube, the tube and the work are relatively displaced parallel with the line of the joint so that the molten solder is laid progressively along the corner angle. Preferably the tube 56 is fixed and the work is displaced relative to the tube. It is also preferable for the tube 56 to be flexible and for its discharge end portion actually to bear against the spacer strip 52 and the coated margin of the sheet 51. In this embodiment the solder metal is actually sheltered from the atmosphere until it enters the corner angle in which the solder bead is to be formed so that there is substantially no oxidation of the solder metal.

It is to be understood that a process according to the invention can be performed for soldering a spacer strip to a first glass sheet of a glazing unit before a second glass sheet is connected to the spacer strip. When connecting the spacer strip to the first glass sheet it is necessary to provide some means for keeping or insuring correct positioning of the spacer strip in relation to the margin of the glass sheet. Any suitable positioning or guiding means may be used for this purpose.

FIG. 7 illustrates a process in which the invention is employed for soldering a spacer strip 57 to a metal coating 58 on a margin of a glass sheet 59, preparatory to soldering the spacer strip 57 to a second glass sheet to form a glazing unit. In order to insure correct positioning of the spacer strip 57 in relation to the glass sheet 59, a guide device is used which comprises a wooden block 60 in one edge face of which there is formed a rebate groove 61 having a depth substantially equal to the thickness of the spacer strip 57 and a width (measured in the vertical direction in the aspect of the figure) which is fractionally less than the width of the spacer strip. A metal lath 62 is secured by screws such as 63 to the edge face of the wooden block in such a position that one margin of the lath overhangs the inner margin of the rebate groove. The lath can thus serve as illustrated to retain the spacer strip 57 in the rebate groove and the spacer strip 57 is thereby held in correct perdetermined position which is dependent on the position of the block 60. The glass sheet 59, with the spacer strip 57 so positioned thereon is placed on a stationary support and a solder feeder 64 is displaced relative to the work along guide rails 65 passing through guide blocks 66 on the bottom of the said feeder. The feeder 64 may be constructed in the same manner as the feeder 13 described with reference to FIGS. 1 to 3 and operates to discharge a stream 67 of molten solder directly into the exterior corner angle between the spacer strip 57 and the coated margin of the sheet 59 so as to form a solder bead 68 of the required form. The soldering installation may include heating means, which may for example take the form of gas burners as used in the installation described with reference to FIGS. 1 to 3, for pre-heating the coated margin of the glass sheet and/or the spacer strip and may also incorporate one or more gas burners to provide a flame or flames which act on the solder bead 68 before the solder metal of which it is composed has completely solidified. If any such heating means is provided it is preferably displaced along guideways together with and at the same speed as the solder feeder 64 and in fact such heating means may actually be connected to that feeder so as to more therewith as a unit.

The following data relate to an installation as described with reference to FIGS. 1 to 3, which has been used with very good results:

Relative speed of displacement between the work, the solder feeder: 15 m per minute.

Distance between the solder discharge orifice 22 and the vertex of the corner angle: 10–15 mm.

Amount of solder discharged in a single pass 30 g per meter.

Diameter of solder discharge orifice: 0.5–1 mm.

Composition of solder: 50% Sn, 50% Pb.

Temperature of solder: 270°C.

While the invention has been described particularly for use in manufacturing a glazing unit comprising only two sheets of glass joined to a spacer strip or strips, the invention can be used in the manufacture of a glazing unit comprising more than two sheets of glass held in spaced relation. Thus, the invention can be used for soldering a further spacer strip or strips onto what is the upper face of the glass sheet 3 in FIG. 1 preparatory to securing a further glass sheet onto that additional spacer strip or strips in order to form a triple-glazing unit, i.e., a unit comprising three sheets of glass connected together in spaced relation by intervening spacer strips.

What is claimed is:

1. In a process for manufacturing a glazing unit by jointing a metallized margin of a sheet of glass to an intervening spacer strip following a course along the peripheral margin of the unit in which the joint between said sheet and said strip along at least a section of such course is formed by applying solder into the corner angle between such sheet and said strip to form a solder bead along said section, the improvement comprising progressively forming said solder bead at least in part by discharging a continuous stream of molten solder directly into said corner angle from an adjacent orifice while such orifice on the one hand and said strip and sheet on the other hand are relatively displaced substantially parallel with said course section, the position and orientation of said orifice and the discharge velocity of the solder stream in relation to the position of the sheet and strip defining said corner angle being such as to cause the solder stream to initially impinge against one of the surfaces defining the corner angle and flow toward the vertex of the corner angle.

2. A process according to claim 1, characterized in that said sheet and spacer strip defining said corner angle are displaced parallel with the line of the joint while said orifice is held stationary.

3. A process according to claim 1 characterized in that said stream follows a free trajectory with a horizontal component of motion generally transverse to the direction of said relative displacement.

4. A process according to claim 3, characterized in that said free trajectory is at least 1 cm but not more than 5 cm in length.

5. A process according to claim 1 characterized in that at least one of the surfaces defining said corner angle is pre-heated.

6. A process according to claim 5, characterized in that said pre-heating is achieved by means of a flame of burning gas.

* * * * *